US007310445B2

(12) United States Patent
Kupeev et al.

(10) Patent No.: US 7,310,445 B2
(45) Date of Patent: Dec. 18, 2007

(54) CLASSIFICATION OF IMAGE BLOCKS BY REGION CONTRAST SIGNIFICANCE AND USES THEREFOR IN SELECTIVE IMAGE ENHANCEMENT IN VIDEO AND IMAGE CODING

(75) Inventors: Konstantin Kupeev, Haifa (IL); Zohar Sivan, Zichron Yaacov (IL)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 10/723,739

(22) Filed: Nov. 26, 2003

(65) Prior Publication Data

US 2005/0111744 A1 May 26, 2005

(51) Int. Cl.
*G06K 9/34* (2006.01)
(52) U.S. Cl. ................. 382/173; 382/236; 382/243; 382/250
(58) Field of Classification Search ............ 382/173, 382/232, 236, 243, 250, 274
See application file for complete search history.

(56) References Cited

U.S. PATENT DOCUMENTS

| 4,689,671 | A | * | 8/1987 | Ohki et al. ............ 375/240.13 |
| 5,793,895 | A | | 8/1998 | Chang et al. |
| 6,005,981 | A | * | 12/1999 | Ng et al. ................... 382/240 |
| 6,272,253 | B1 | * | 8/2001 | Bannon et al. ............ 382/236 |
| 6,826,230 | B1 | * | 11/2004 | Salembier ............ 375/240.13 |

OTHER PUBLICATIONS

Wang, Yao, et al., "Error Resilient Video Coding Techniques," IEEE Signal Processing Magazine, vol. 17, No. 4, pp. 61-82, Jul. 2000.
Willebeek-LeMair, Marc, et al., "Robust H.263 Video Coding for Transmission over the Internet," Proceedings of IEEE Conference on Computer Communications, San Francisco, CA, Mar. 1998.
Worrall, S.T., et al., "Motion Adaptive Intra Refresh for MPEG-4", IEEE Electronics Letters, Nov. 9, 2000, vol. 36, No. 23, pp. 1924-1925.
Zhang, Rui, et al., "Optimal Intra/Inter Mode Switching for Robust Video Communication over the Internet," Conference Record of the Thirty-Third Asilomar Conference on Signals, Systems, and Computers, vol. 1, 1999 pp. 332-336.
Salembier, P., et al., "Region-based representations of image and video: Segmentation tools for multimedia services", IEEE Transactions on Circuits and Systems for Video Technology, 9(8):1147-1167, Dec. 1999.
Kupeev, Konstantin, et al., "Selective Enhancement of Contrast Blocks for MPEG/JPEG Image Compression", Visual Communications and Image Processing (VCIP) 2003, Lugano, Switzerland, pp. 1382-1389.

* cited by examiner

*Primary Examiner*—Phuoc Tran

(57) ABSTRACT

Determining image block significance based on region contrast, including partitioning an image into multiple regions of at least one pixel each, pairing any region with an unpaired, adjoining region, calculating a similarity value for any region pair, merging paired regions of any pair into a single region, where the region pair to be merged has a predefined similarity value, thereby creating a new image partition of multiple regions, repeatedly performing the preceding steps, thereby obtaining a sequence of image partitions, selecting within the image an image sub-area of a predefined size and shape, identifying a partition in the sequence in which the image sub-area is covered by any region to the extent of a predefined coverage measure, and calculating a region contrast significance value of the image sub-area as a value which is proportional to the position of the identified partition in the sequence.

32 Claims, 10 Drawing Sheets

$$L(B) = \begin{cases} 64 & \text{if } C(B) \geq T \\ k \times C(B) & \text{otherwise.} \end{cases}$$

CLASSIFICATION OF IMAGE BLOCKS BY REGION CONTRAST SIGNIFICANCE AND USES THEREFOR IN SELECTIVE IMAGE ENHANCEMENT IN VIDEO AND IMAGE CODING

FIELD OF THE INVENTION

The present invention relates to compression of video image data and optimization thereof.

BACKGROUND OF THE INVENTION

Exploiting characteristics of the Human Visual System (HVS) for the compression of video and still images is a field of active interest in video compression research. Several factors of varying significance have been discovered to influence human visual attention, such as motion, contrast, image element size, etc., and various techniques have been developed that attempt to define those regions in an image that are of greatest significance, such as those to which human visual attention is most sensitive. This significance information is then used to affect the compression of video/still images in a way that enhances the viewing quality of more significant regions. While this may be accomplished by using lower DCT quantizer values for more perceptually significant blocks, not all encoding standards support flexible alternation of the quantizer at the block or macroblock level.

HVS-significant image regions are particularly sensitive to distortions introduced by damaged or lost data and error propagation. In MPEG encoding, I-frames (INTRA-frames), in which complete image frames are encoded, are followed by one or more P-frames (INTER-frames) in which the difference between the current image frame and a previous image frame is encoded. To prevent error propagation among the P-frames until the next I-frame is reached, portions of the P-frames known as INTRA blocks are encoded as-is, without respect to previous frames. While various techniques for the spatial positioning of INTRA blocks within P-frames for error-resilient video encoding have been suggested, these techniques do not adequately take in account the mechanisms of the Human Visual System.

A technique for determining image block significance in terms of the Human Visual System that may then be adapted for optimizing standard encoding techniques with little or no increase in encoding/decoding overhead would therefore be advantageous.

SUMMARY OF THE INVENTION

The present invention provides for determining image sub-area significance based on region contrast and employing sub-area significance for optimized encoding. A new region contrast significance measure C(B) is introduced for image sub-areas B of predefined size and shape, such as 8×8 pixel image blocks, where C(B) may be defined to be proportional to the number of the first partition in a sequence of region merging partitions which covers B to the extent of a predefined coverage measure, such as complete coverage. Methods and apparatus are disclosed for the computation of C(B); for using the introduced measure for selective image enhancement in image/video compression by truncating the DCT coefficients or alternating the quantizer values; for error-resilient video encoding that gives preference for INTRA-mode encoding to the areas B with high values of C(B); and for error-resilient video encoding that gives preference for INTRA-mode encoding to the areas B which include pixels from different image regions obtained as the result of segmenting the image using conventional segmentation techniques.

In one aspect of the present invention a method is provided for determining image block significance based on region contrast, the method including a) partitioning an image frame into multiple pixel regions of at least one pixel each, b) pairing any of the regions with an unpaired, adjoining region, c) calculating a similarity value between each region in any of the region pairs, d) merging paired regions of any of the pairs into a single region, where the region pair to be merged has a predefined similarity value, thereby creating a new partition of the image frame into multiple pixel regions, e) performing steps a)-d) a plurality of times, thereby obtaining a sequence of image partitions, f) selecting within the image frame an image sub-area of a predefined size and shape, g) identifying a partition in the sequence of partitions in which the image sub-area is covered by any of the regions to the extent of a predefined coverage measure, and h) calculating a region contrast significance value C(B) of the image sub-area as a value which is proportional to the position of the identified partition in the sequence of partitions.

In another aspect of the present invention the calculating step c) includes calculating the contrast between any of the pairs.

In another aspect of the present invention the calculating step c) includes calculating the average luminescence of the pixels in one region in any of the pairs, and subtracting the average luminescence from the average luminescence of the pixels in the other region in the pair.

In another aspect of the present invention the merging step d) includes merging where the region pair to be merged has a predefined similarity value representing the least absolute contrast of any of the pairs.

In another aspect of the present invention the performing step e) includes performing until a predefined number of regions is achieved.

In another aspect of the present invention the performing step e) includes performing until the similarity value reaches a predefined threshold value.

In another aspect of the present invention the performing step e) includes performing until a predefined stop condition is met.

In another aspect of the present invention the selecting step f) includes selecting an 8×8 pixel block.

In another aspect of the present invention the identifying step g) includes identifying the first partition in the sequence of partitions in which the image sub-area is covered by any of the regions to the extent of the predefined coverage measure.

In another aspect of the present invention the identifying step g) includes identifying the partition in the sequence of partitions in which the image sub-area is completely covered by any of the regions.

In another aspect of the present invention the identifying step g) includes identifying the first partition in the sequence of partitions in which the image sub-area is completely covered by any of the regions.

In another aspect of the present invention any of the steps are performed on either of a JPEG image and an MPEG video frame.

In another aspect of the present invention a method is provided for encoding image sub-areas, the method including a) partitioning an image frame into multiple pixel regions of at least one pixel each, b) pairing any of the regions with an unpaired, adjoining region, c) calculating a similarity value between each region in any of the region pairs, d) merging paired regions of any of the pairs into a single region, where the region pair to be merged has a predefined similarity value, thereby creating a new partition of the image frame into multiple pixel regions, e) performing steps a)-d) a plurality of times, thereby obtaining a sequence of image partitions, f) selecting within the image frame an image sub-area of a predefined size and shape, g) identifying a partition in the sequence of partitions in which the image sub-area is covered by any of the regions to the extent of a predefined coverage measure, h) calculating a region contrast significance value of the image sub-area as a value which is proportional to the position of the identified partition in the sequence of partitions, and i) designating the image sub-area for enhanced encoding by a video encoder where the significance value meets a predefined criterion.

In another aspect of the present invention any of the steps are performed on either of a JPEG image and an MPEG video frame.

In another aspect of the present invention the designating step includes designating where the significance value is at or above a predetermined threshold.

In another aspect of the present invention the designating step includes quantizing DCT coefficients of the image sub-area using lower quantizer values than for another image sub-area whose significance value is below the predetermined threshold.

In another aspect of the present invention the designating step includes scanning DCT coefficients of the image sub-area in accordance with a predefined scanning pattern, and halting the scanning when L(B) of the DCT coefficients have been scanned, where L(B)=64 if C(B)>=T, and where L(B)=k×C(B) otherwise, where T is a predefined significance threshold and k is a predefined scaling factor.

In another aspect of the present invention the designating step includes scanning DCT coefficients of the image sub-area in accordance with a predefined scanning pattern, and quantizing any of the DCT coefficients located at an i-th position of the scanning pattern using a quantizer value as P(i)*(M−k*C(B)), where P(i) is a value of a quantization pattern for i-th position of the scanning pattern, where M is a quantization threshold, and where k is a predefined scaling factor.

In another aspect of the present invention the designating step includes determining that the image sub-area is to be encoded in INTRA encoding mode where the significance value meets the predefined criterion.

In another aspect of the present invention the designating step includes determining that the image sub-area is to be encoded in INTRA encoding mode if the image sub-area has a significance value at or above a predetermined threshold.

In another aspect of the present invention the designating step includes determining that the image sub-area is to be encoded as the difference between the sub-area and a sub-area in another frame if the first sub-area has a significance value below the threshold.

In another aspect of the present invention a method is provided for encoding image sub-areas, the method including segmenting an image into a plurality of regions, and encoding an image sub-area of an INTER-frame as an INTRA block where the image sub-area contains pixels from at least two of the regions.

In another aspect of the present invention apparatus is provided for encoding image sub-areas according to their significance, including a video encoder, and a computation module operative to a) partition an image frame into multiple pixel regions of at least one pixel each, b) pair any of the regions with an unpaired, adjoining region, c) calculate a similarity value between each region in any of the region pairs, d) merge paired regions of any of the pairs into a single region, where the region pair to be merged has a predefined similarity value, thereby creating a new partition of the image frame into multiple pixel regions, e) perform steps a)-d) a plurality of times, thereby obtaining a sequence of image partitions, f) select within the image frame an image sub-area of a predefined size and shape, g) identify a partition in the sequence of partitions in which the image sub-area is covered by any of the regions to the extent of a predefined coverage measure, h) calculate a region contrast significance value of the image sub-area as a value which is proportional to the position of the identified partition in the sequence of partitions, and i) designate the image sub-area for enhanced encoding by the video encoder where the significance value meets a predefined criterion.

In another aspect of the present invention the computation module is operative to process either of a JPEG image and an MPEG video frame.

In another aspect of the present invention the computation module is operative to designate the image sub-area for enhanced encoding where the significance value is at or above a predetermined threshold.

In another aspect of the present invention the computation module is operative to quantize DCT coefficients of the image sub-area using lower quantizer values than for another image sub-area whose significance value is below the predetermined threshold.

In another aspect of the present invention the computation module is operative to scan DCT coefficients of the image sub-area in accordance with a predefined scanning pattern, and halt the scanning when L(B) of the DCT coefficients have been scanned, where L(B)=64 if C(B)>=T, and where L(B)=k×C(B) otherwise, where T is a predefined significance threshold and k is a predefined scaling factor.

In another aspect of the present invention the computation module is operative to scan DCT coefficients of the image sub-area in accordance with a predefined scanning pattern, and quantize any of the DCT coefficients located at an i-th position of the scanning pattern using a quantizer value as P(i)*(M−k*C(B)), where P(i) is a value of a quantization pattern for i-th position of the scanning pattern, where M is a quantization threshold, and where k is a predefined scaling factor.

In another aspect of the present invention the computation module is operative to determine that the image sub-area is to be encoded in INTRA encoding mode where the significance value meets the predefined criterion.

In another aspect of the present invention the computation module is operative to determine that the image sub-area is to be encoded in INTRA encoding mode if the image sub-area has a significance value at or above a predetermined threshold.

In another aspect of the present invention the computation module is operative to determine that the image sub-area is to be encoded as the difference between the sub-area and a sub-area in another frame if the first sub-area has a significance value below the threshold.

In another aspect of the present invention a computer program is provided embodied on a computer-readable medium, the computer program including a first code segment operative to partition an image frame into multiple pixel regions of at least one pixel each, a second code segment operative to pair any of the regions with an unpaired, adjoining region, a third code segment operative to calculate a similarity value between each region in any of the region pairs, a fourth code segment operative to merge paired regions of any of the pairs into a single region, where the region pair to be merged has a predefined similarity value, thereby creating a new partition of the image frame into multiple pixel regions, a fifth code segment operative to perform steps a)-d) a plurality of times, thereby obtaining a sequence of image partitions, a sixth code segment operative to select within the image frame an image sub-area of a predefined size and shape, a seventh code segment operative to identify a partition in the sequence of partitions in which the image sub-area is covered by any of the regions to the extent of a predefined coverage measure, and a eighth code segment operative to calculate a region contrast significance value of the image sub-area as a value which is proportional to the position of the identified partition in the sequence of partitions.

In another aspect of the present invention the computer program further includes a ninth code segment operative to designate the image sub-area for enhanced encoding by the video encoder where the significance value meets a predefined criterion.

It is appreciated throughout the specification and claims that methods and apparatus described herein with respect to images may be applied to individual video frames, and vice versa.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1A:
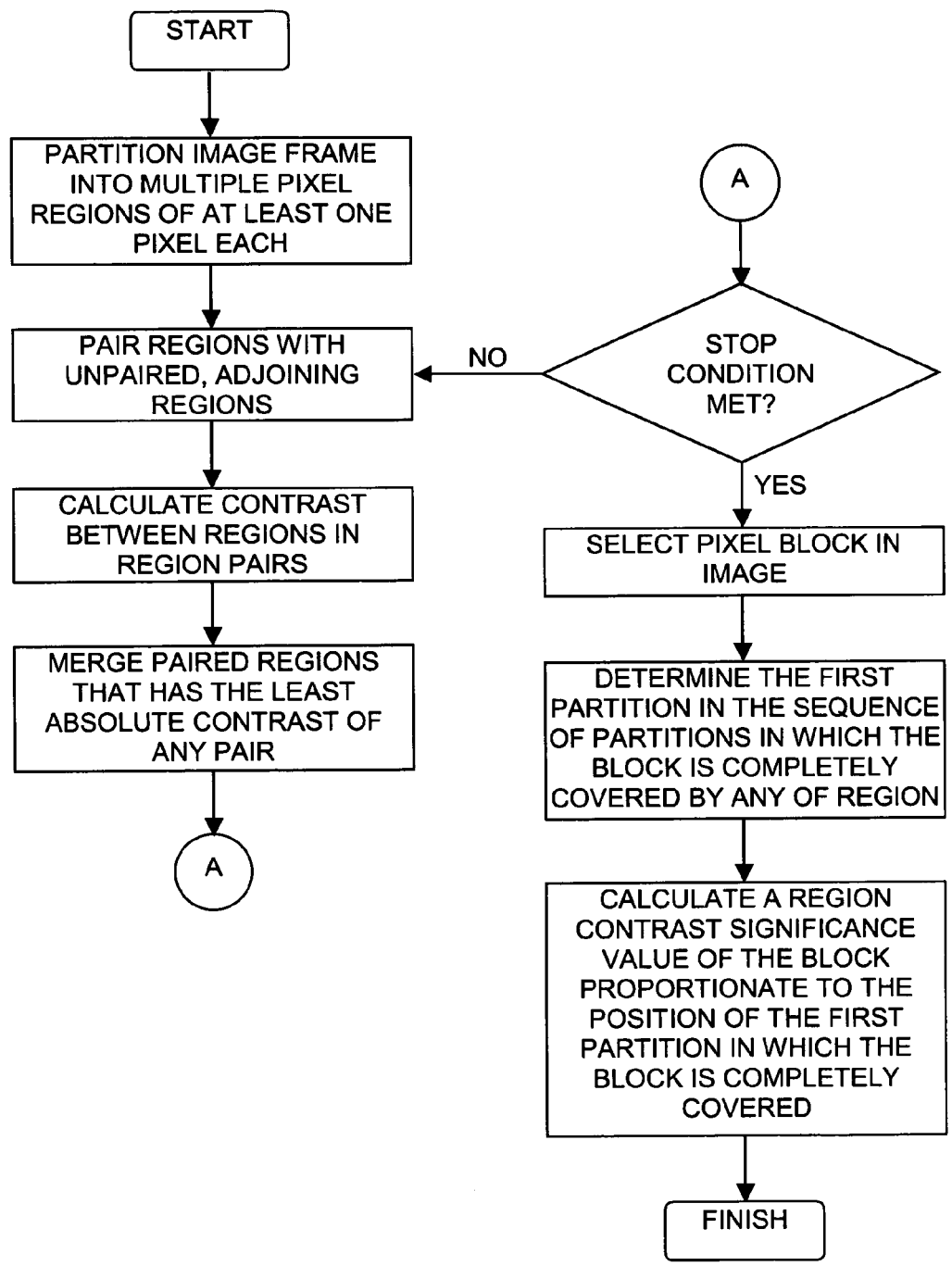
FIG. 1A is a simplified flowchart illustration of a method for determining image sub-area significance, operative in accordance with a preferred embodiment of the present invention.

Reference is now made to FIG. 1A, which is a simplified flowchart illustration of a method for determining image sub-area significance, operative in accordance with a preferred embodiment of the present invention. In the method of FIG. 1A, an image is partitioned into multiple pixel regions of one or more pixels each. Typically, each region initially consists of one pixel. A similarity value for pairs of adjoining regions in the image, and preferably between each pair of adjoining regions in the image, is then calculated. For example, the similarity value may be the contrast between pairs of adjoining regions in the image, and may be calculated using any contrast measurement technique, such as where the average luminescence of the pixels in one region may be calculated and subtracted from the average luminescence of the pixels in an adjoining region. A region pair having a predefined similarity value, such as the greatest similarity value of all region pairs, which, if the similarity value represents contrast, represents the region pair with the least absolute contrast, is then merged into a single region, and the new merged region is then again compared to its adjoining regions. In this manner, region pairing and merging of regions of predefined similarity value may continue until a predefined stop condition is met. For example, region pairing and merging may continue until a predefined number of regions is achieved, such as one region (i.e., the entire original image). Alternatively, region pairing and merging may continue until the predefined similarity value between paired regions reaches a predefined threshold value.

Region merging (RM) as described herein for a given image may start with a partition P(1) having a single pixel and terminate with a partition P(N) comprising the entire image where:

$$RM = P(1), P(2), \ldots, P(N) \qquad \text{EQ. 1}$$

Each partition P(n+1) may be obtained from the previous P(n) by merging two regions $V_1(n)$, $V_2(n)$ such that $$(V_1(n), V_2(n)) = \operatorname{argmin}_{(v1, v2)} F(V_1, V_2), \qquad \text{EQ.2}$$

where F is a similarity function defined for adjacent regions in P(n). The minimum value $F(V_1(n), V_2(n))$ is further referred to herein as $\phi(n)$.

For an image sub-area B of a predefined size and shape, such as an 8×8 pixel block, from the image there exists a partition, P(m), m=m(B), that represents the first partition to cover B to the extent of a predefined coverage measure, such as complete coverage. It may be seen that larger values of m(B) would indicate that B contains pixels from regions of greater contrast that are merged at later stages of the region merging procedure, while smaller values of m(B) would indicate that B contains pixels from more homogeneous regions of lesser contrast that are merged earlier. A measure C(B) of region contrast significance may be expressed in a variety of ways. For example, C(B) may be defined as:

$$C(B) = m(B). \qquad \text{EQ. 3}$$

Alternatively, C(B) may be defined as the percentage of all image sub-areas in the frame that were covered by regions to the extent of a predefined coverage measure, such as complete coverage, at the time that block image sub-area B was first covered by a region to the same or a different predefined extent.

C(B) may also be defined such that image sub-areas within the same homogeneous image region are assigned similar significance values as follows. A similarity measure F may be defined as the absolute difference between the average luminance values Y(V) of the regions V comprising the partitions P(n). Initially, for adjacent regions $V_1$, $V_2$ in P(1) comprising one pixel each, F may be expressed as:

$$F(V_1, V_2)=|Y(V_1), Y(V_2)|. \qquad \text{EQ. 4}$$

Figure 1B:
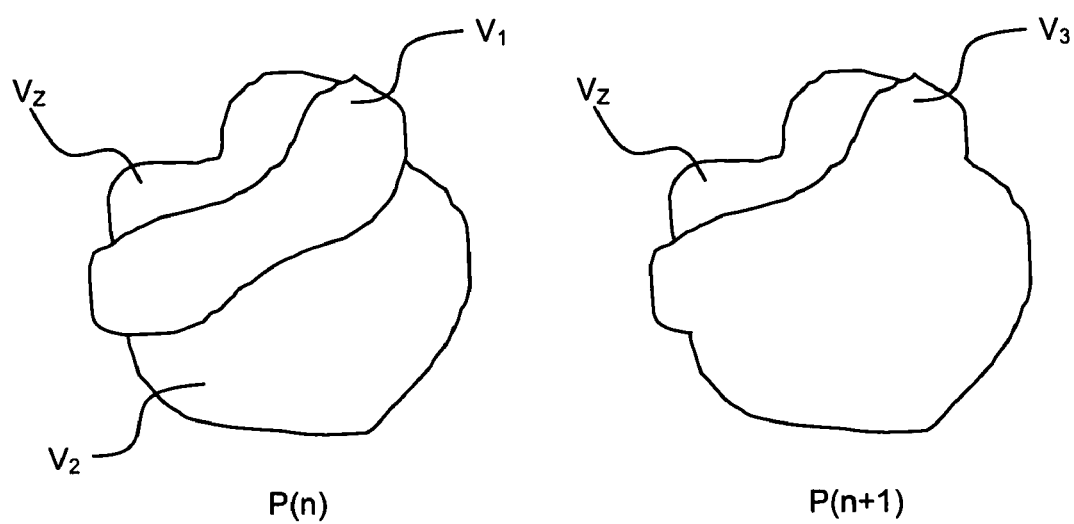
FIG. 1B is a simplified pictorial illustration of merged regions, useful in understanding the present invention.

FIG. 1B shows a merged region $V_3$ obtained by merging the regions $V_1$ and $V_2$ in P(n) at an (n+1)-th step in the merging process. The similarity function may be defined as follows in EQ. 5. Where $V_Z$ is a region in P(n) adjacent to $V_1$:

$$F(V_Z, V_3) = \{\max(F(V_Z, V_1), F(V_Z, V_2), |Y(V_Z) - Y(V_3)| \text{ if } V_Z$$
$$\text{is adjacent to } V_2$$
$$\{\max(F(V_Z, V_1), |Y(V_Z) - Y(V_3)| \text{ otherwise}$$

It may be seen that EQ. 5 ensures that the function φ(n) increases, and that the values of φ(n) do not exceed the maximal luminance value. This allows the significance of image sub-area B to be defined as:

$$C(B)=\phi(m(B)/M, \qquad \text{EQ. 6}$$

where the maximal luminance value M=255.

The computational cost of the measures Co described hereinabove may be reduced as follows. Let $V_1=V_1(n)$, $V_2=V_2(n)$ denote the regions merged at an n-th step of the merging procedure. Define $\text{Cov}(V_1, V_2)$ as the family of the image sub-areas which are covered to the extent of a predefined coverage measure, such as complete coverage, by the merged regions at the n-th step:

$$\text{Cov}(V_1, V_2)=\{B|B\cap V_1\neq\emptyset, B\cap V_2\neq\emptyset, B\subseteq V_1\cup V_2\} \qquad \text{EQ. 7}$$

It is appreciated that the computation of C() may be reduced to the computation of $\text{Cov}(V_1, V_2)$ Straightforward computation of the family implies exhaustive enumeration of all the pixels of the merged regions for each n. For a large value of N, this essentially increases the time-complexity of the computation of C(). To avoid this, for each region V defined during the merging procedure a family Br(V) of boundary blocks may be defined as:

$$Br(V)=\{B|B\cap V\neq\emptyset \text{ and } B\not\subseteq V\} \qquad \text{EQ. 8}$$

It may be seen that:

$$\text{Cov}(V_1, V_2)=\{B|B\in Br(V_1)\cup Br(V_2) \text{ and } B\subseteq V_1\cup V_2\} \qquad \text{EQ. 9}$$

and $$Br(V_1\cup V_2)=\{B|B\in Br(V_1)\cup Br(V_2)\backslash\text{Cov}(V_1, V_2)\} \qquad \text{EQ. 10}$$

At each n-th step of the merging procedure, the family $\text{Cov}(V_1, V_2)$ may be obtained using EQ. 9, and the family Br may be obtained for a new region $V_1\cup V_2$ using EQ. 10. This allows for the contrast measurements described hereinabove to be performed only upon the boundary blocks between regions, thus making the complexity of the computation of Co comparable to the complexity of region merging.

Figure 2A:
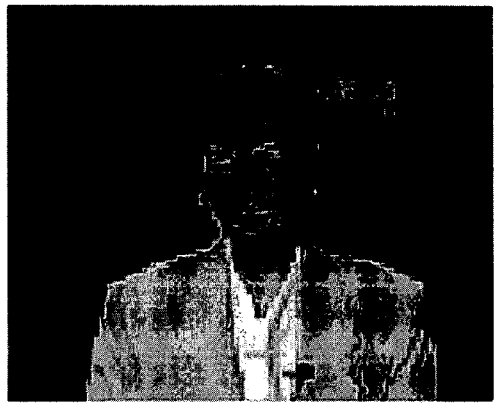
FIGS. 2A-2B, 3A-3B and 4A-4B are sample video frames processed in accordance with a preferred embodiment of the present invention.
Figure 2B:
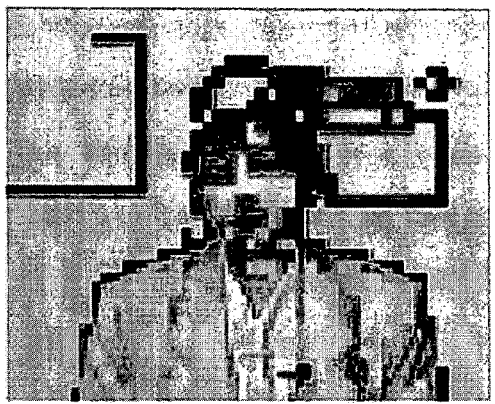
Figure 3A:
Figure 3B:
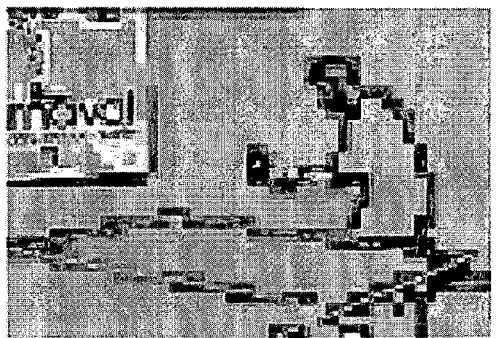
Figure 4A:
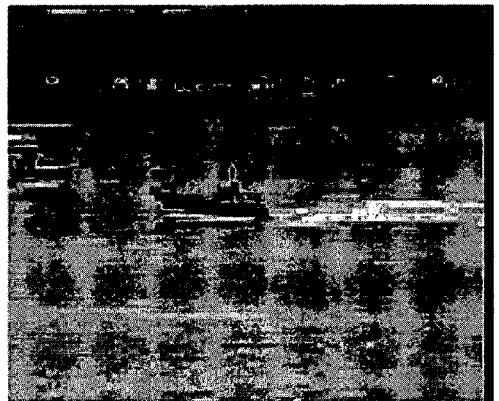
Figure 4B:
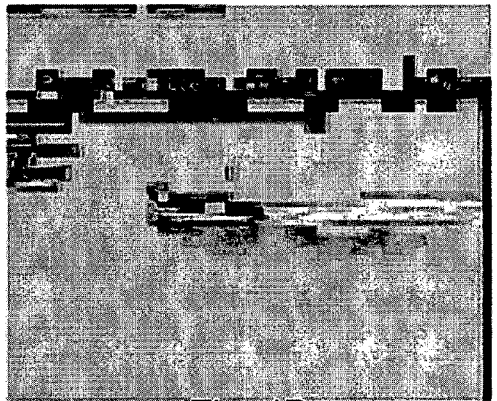

Reference is now made to FIGS. 2A-2B, 3A-3B, and 4A-4B, which are sample video frames before and after processing using region merging as described hereinabove. 8×8 pixel blocks whose significance exceeds a predefined frame-dependent threshold are shown in FIGS. 2B, 3B, and 4B, with significance of C(B)≧T thresholds of T=40.1 (FIG. 2B), T=126.0 (FIG. 3B), and T=95.0 (FIG. 4B).

Figure 5:
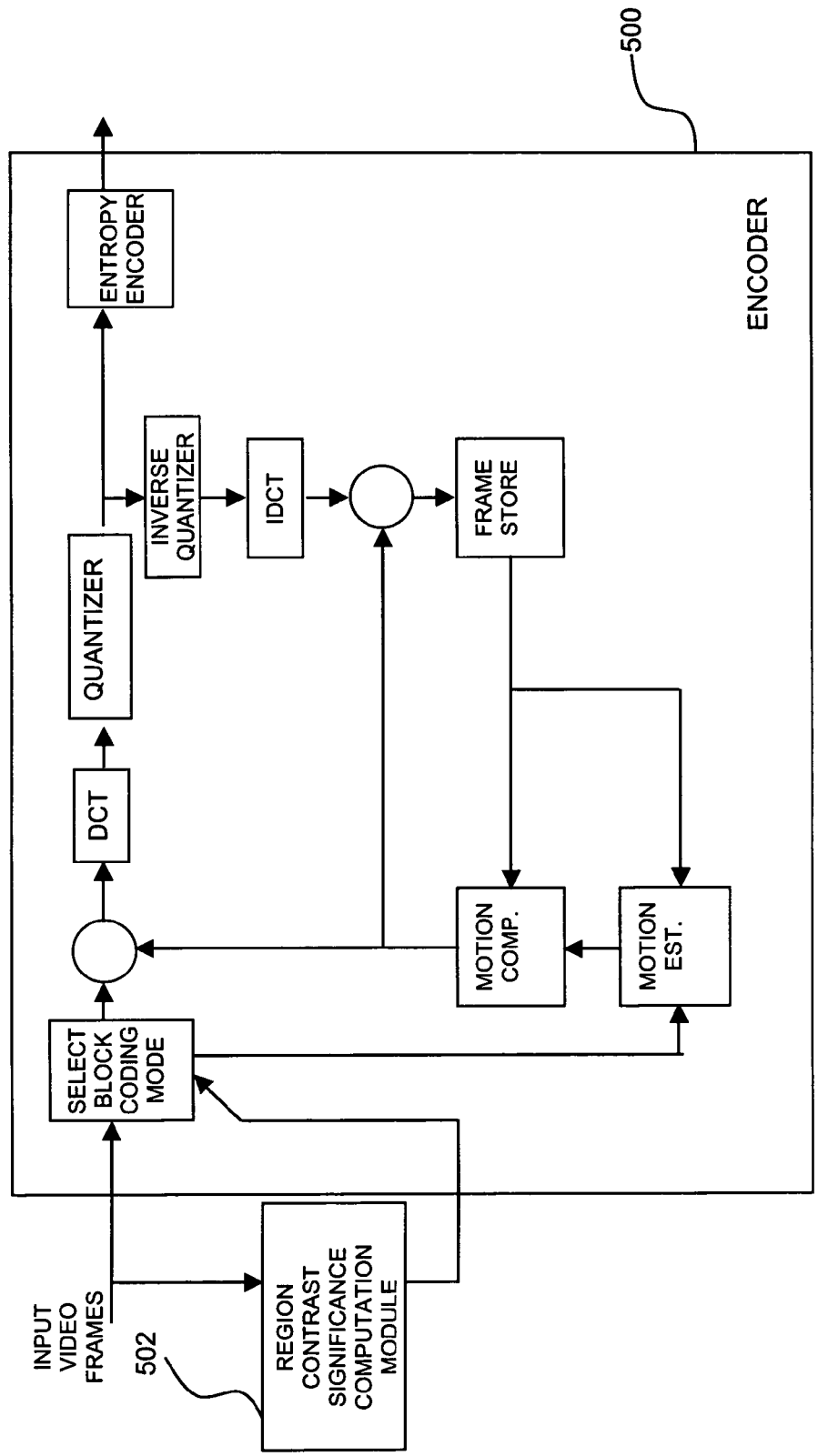
FIG. 5 is a simplified block diagram of a video encoder adapted for encoding image sub-areas according to their significance, constructed and operative in accordance with a preferred embodiment of the present invention.

Reference is now made to FIG. 5, which is a simplified block diagram of a video encoder adapted for encoding image sub-areas according to their significance, constructed and operative in accordance with a preferred embodiment of the present invention. In FIG. 5 a standard video encoder generally designated 500 is shown having a region contrast significance (RCS) computation module 502 for computing significance of input image sub-areas, such as 8×8 pixel blocks, in accordance with the methods described hereinabove. Encoder 500 may be, for example, an MPEG encoder. RCS computation module 502 typically receives a raw video frame and computes a significance value C(B) for each block B of the frame as described hereinabove. The values of C(B) are preferably used by encoder 500 in accordance with predetermined criteria to determine whether the image sub-area should undergo enhanced encoding by encoder 500. Preferably, encoder 500 gives preference for INTRA-block encoding in P-frames to the blocks B with a high significance value C(B). For example, module 502 may determine that a block of a P-frame having a significance below a predefined threshold should be encoded as the difference between the block and a similar block in another frame, or encoded as-is as an INTRA block by giving preference in INTRA block encoding to the blocks with significance at or above the threshold. This is illustrated in FIG. 8 in which two blocks B1 and B2 are shown, where C(B1) is expected to indicate a greater significance than C(B2). Block B1 would thus be preferred for INTRA-block encoding over block B2. This determination may be used in addition to other determination criteria, such as in MPEG-4 where a macroblock is required to be encoded in INTRA-refresh mode at some point before it is encoded 132 times as predictive macroblock. Preferred methods for selecting image blocks for INTRA-block refresh are described in greater detail hereinbelow with reference to FIGS. 6 and 7.

Figure 6:
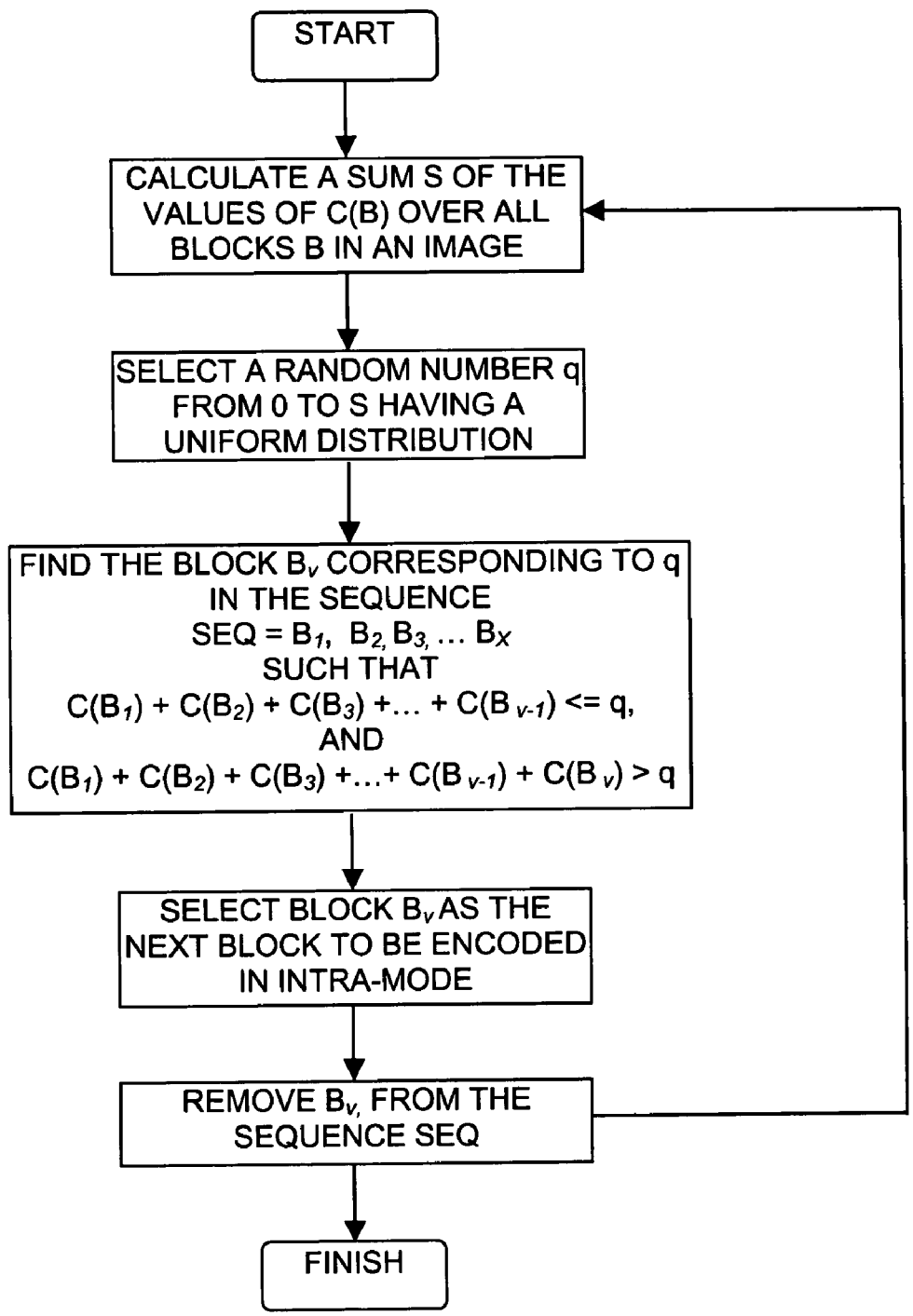
FIG. 6 is a simplified flowchart illustration of a method for selecting image sub-areas for INTRA encoding according to their significance, operative in accordance with a preferred embodiment of the present invention.

Reference is now made to FIG. 6, which is a simplified flowchart illustration of a method for selecting image sub-areas for INTRA encoding according to their significance, operative in accordance with a preferred embodiment of the present invention. In the method of FIG. 6, Fr denotes an image or frame, and R=R(Fr) denotes the number of predefined image sub-areas B, such as 8×8 pixel blocks, in Fr that an encoder will encode in INTRA-mode. A sum S of the values of C(B) over all image sub-areas B in Fr is computed as $$S=C(B_1)+C(B_2)+C(B_3)+\ldots\_+C(B_X),$$

where X denotes the number of the image sub-areas in frame Fr. A random number q is then selected in the segment [0; S] having a uniform distribution. The image sub-area $B_v$ corresponding to q in the sequence $$\text{SEQ}=B_1, B_2, B_3, \ldots B_X$$

is then found where v is a number such that:

$C(B_1)+C(B_2)+C(B_3)+\ldots\_+C(B_{v-1})$ is less or equal to q, and $C(B_1)+C(B_2)+C(B_3)+\ldots\_+C(B_{v-1})+C(B_v)$ is greater then q.

It may be seen that the larger the value of C(B), the greater the chance that q will fall to the "bin" C(B). The image sub-area $B_v$ is the first image sub-area in frame Fr selected for encoding in INTRA-mode. After the selection of $B_v$ the image sub-area is removed from the sequence SEQ, the sum S decreases by C(B$_v$), and the procedure is repeated for the selection of the second image sub-area, and so on.

Figure 7:
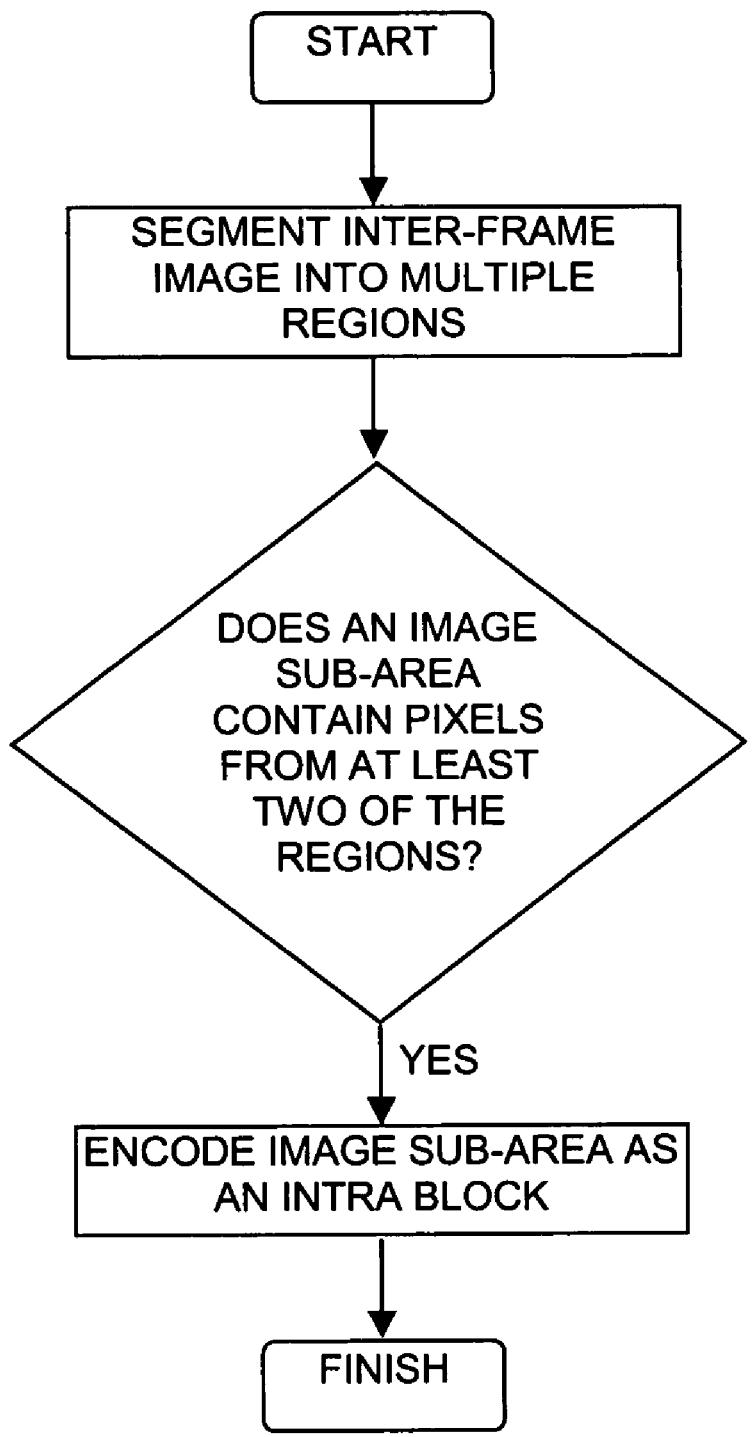
FIG. 7 is a simplified flowchart illustration of a method for selecting image sub-areas for INTRA encoding according to their significance, operative in accordance with a preferred embodiment of the present invention.
Figure 8:
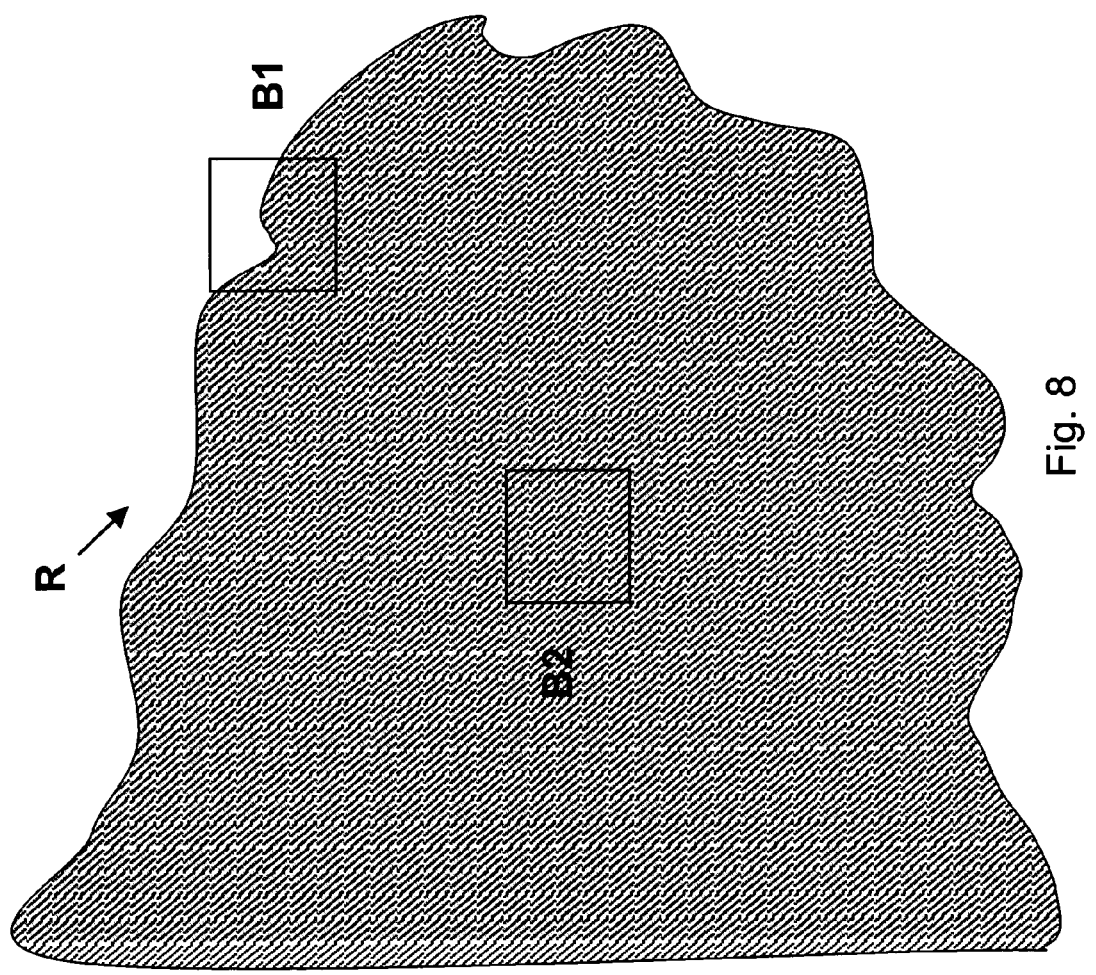
FIG. 8 is a simplified graphical illustration of image blocks of different expected contrast significance, useful in understanding the present invention.

Reference is now made to FIG. 7, which is a simplified flowchart illustration of a method for selecting image sub-areas for INTRA encoding according to their significance, operative in accordance with a preferred embodiment of the present invention. In the method of FIG. 7, an image or video frame is segmented using any conventional technique into N regions to form a partition RS=R$_1$, R$_2$, R$_3$, ..., R$_N$. Image sub-areas B in RS, being of a predefined size and shape, such as 8×8 pixel blocks, are examined to determine whether B contains pixels from different regions of RS. A sub-area B containing pixels from different regions from RS is assigned a larger value of C(B) relative to a sub-area B which lay completely in a region R$_i$ in RS. For example, 8×8 pixel blocks B which lay completely in a region R$_i$ in RS may be assigned a significance value C(B)=0, whereas 8×8 pixels blocks B which contain pixels from different regions in RS may be assigned a significance value C(B)=1. Blocks B with a greater C(B) may then be given preference over blocks having a lower C(B) for selection for INTRA-block encoding.

Figure 9:
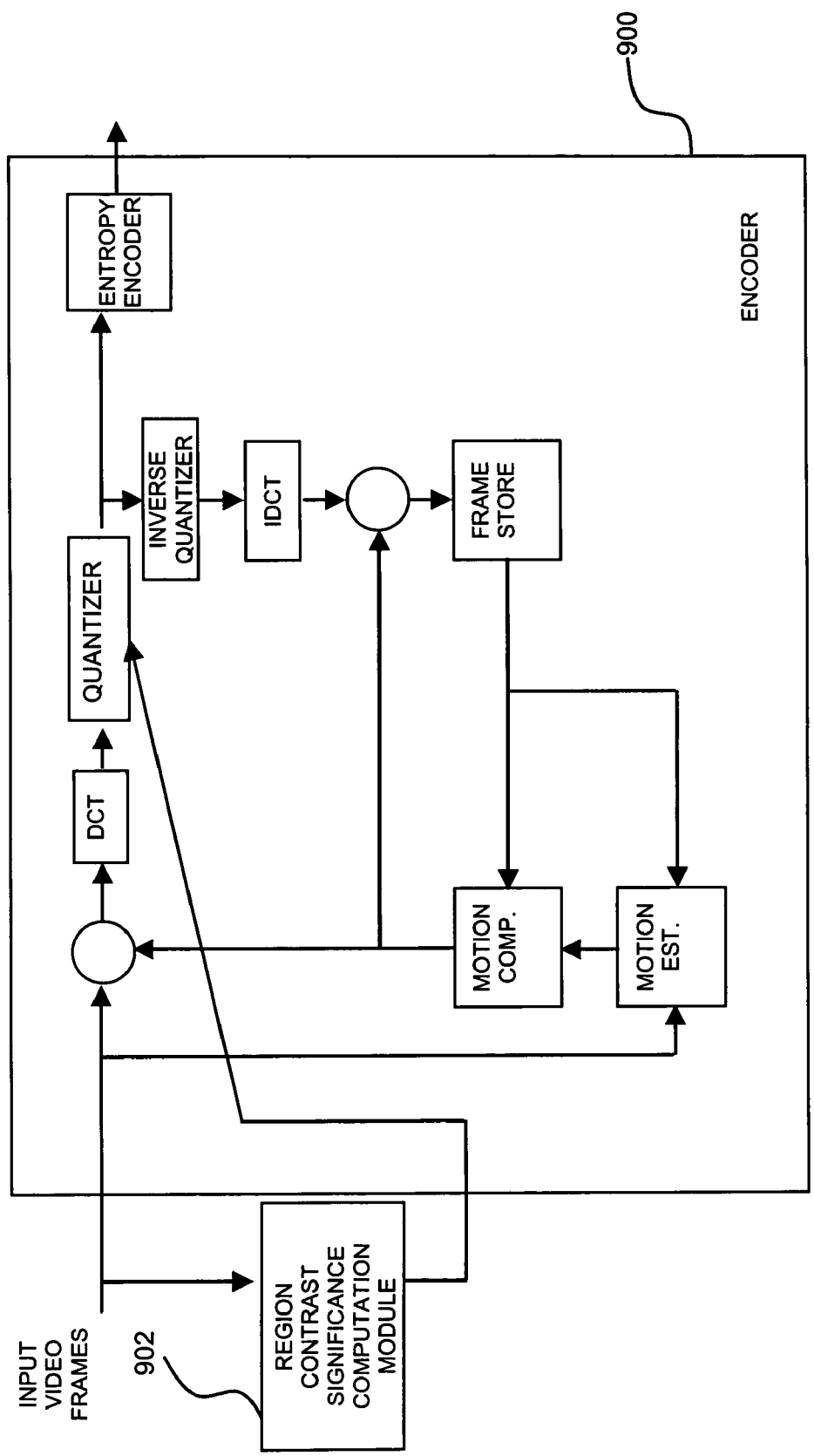
FIG. 9 is a simplified block diagram of a video encoder adapted for encoding image sub-areas according to their significance, constructed and operative in accordance with a preferred embodiment of the present invention.

Reference is now made to FIG. 9, which is a simplified block diagram of a video encoder adapted for encoding image sub-areas according to their significance, constructed and operative in accordance with a preferred embodiment of the present invention. In FIG. 9 a standard video encoder generally designated 900 is shown having an RCS computation module 902 for computing the significance of input image sub-areas, such as 8×8 pixel blocks, in accordance with the methods described hereinabove. Encoder 900 may be, for example, an MPEG-2 encoder. RCS computation module 902 typically receives a raw video frame and computes a significance value C(B) for each block B of the frame. The values of C(B) are preferably used by encoder 700 in accordance with predefined criteria to determine whether the block should undergo enhanced encoding by encoder 900. For example, module 902 may determine that a block having a significance value that is above a predefined threshold should be encoded with a lesser value of MQUANT relative to a block having significance value that is below the predefined threshold. A preferred method for selecting image blocks for lower MQUANT encoding is described in greater detail hereinbelow with reference to FIG. 10. Alternatively, module 902 may determine that the scanning of the DCT coefficients may be curtailed for a block having a significance value that is below a predefined threshold. A preferred method for scanning the DCT coefficients of image sub-areas during encoding is described in greater detail hereinbelow with reference to FIG. 11.

Figure 10:
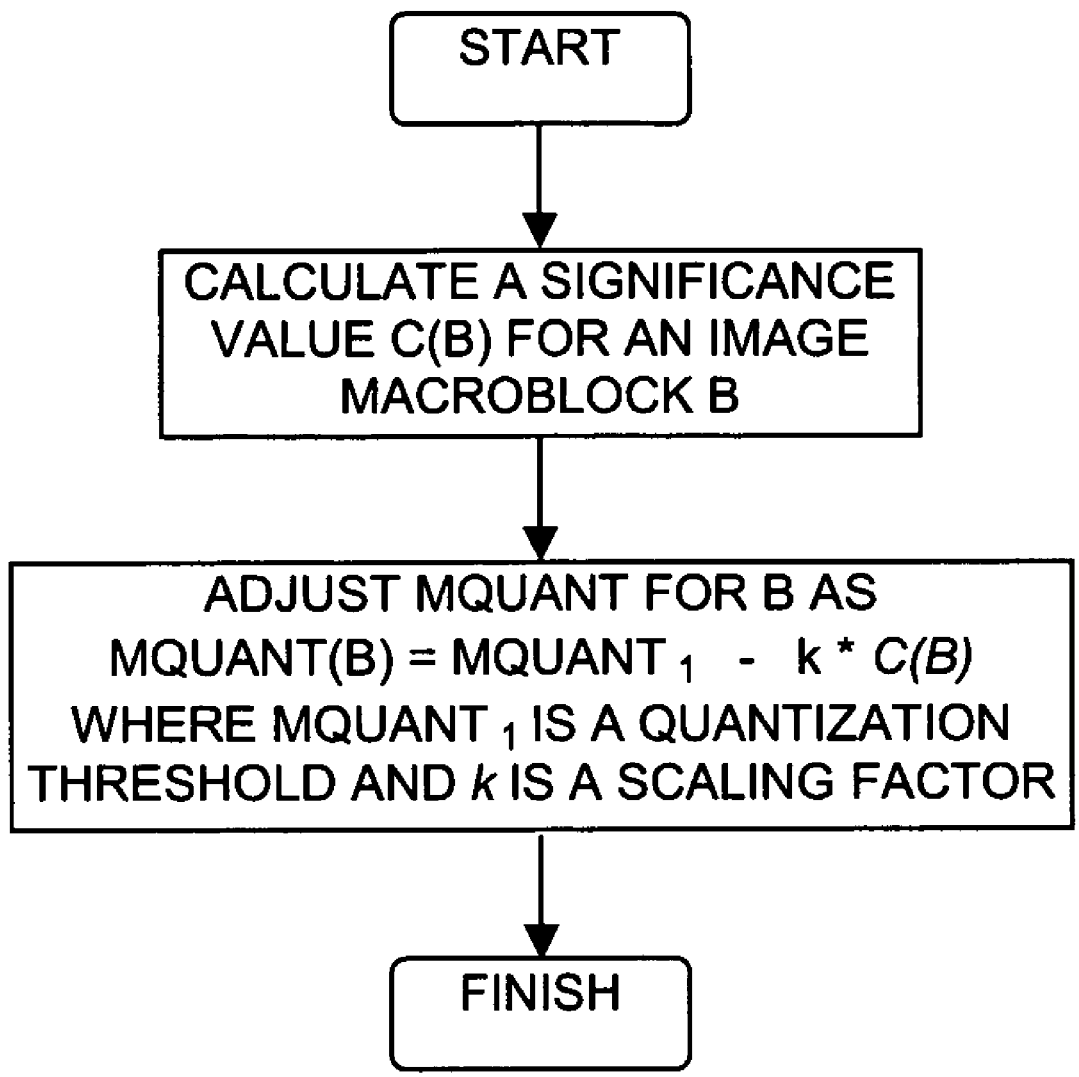
FIG. 10 is a simplified flowchart illustration of a method for selecting image sub-areas for INTRA encoding according to their significance, operative in accordance with a preferred embodiment of the present invention.

Reference is now made to FIG. 10, which is a simplified flowchart illustration of a method for encoding image sub-areas according to their significance, operative in accordance with a preferred embodiment of the present invention. In the method of FIG. 10 the significance measure C(B) of an image sub-area B may be used to regulate the quantization process in image/video compression in such a way that the DCT coefficients of image sub-areas B with higher values of C(B) will be quantized using lower quantizer values relative to the DCT coefficients of image sub-areas B with lower values of C(B). For example, in the MPEG-2 video standard, such regulation may be done for macroblocks B via adjustment of the MQUANT parameter at the macroblock level as follows:

$$MQUANT(B) = MQUANT_1 - k*C(B),$$

where MQUANT(B) is the MQUANT value for a macroblock B. MQUANT$_1$ is a quantization threshold and k is a scaling factor, both of which are image-dependent parameters that may be set by the user and/or using any conventional technique. In the MPEG-4 video standard, such regulation may be similarly performed via adjustment of the DQUANT parameter at the macroblock level.

Figure 11:
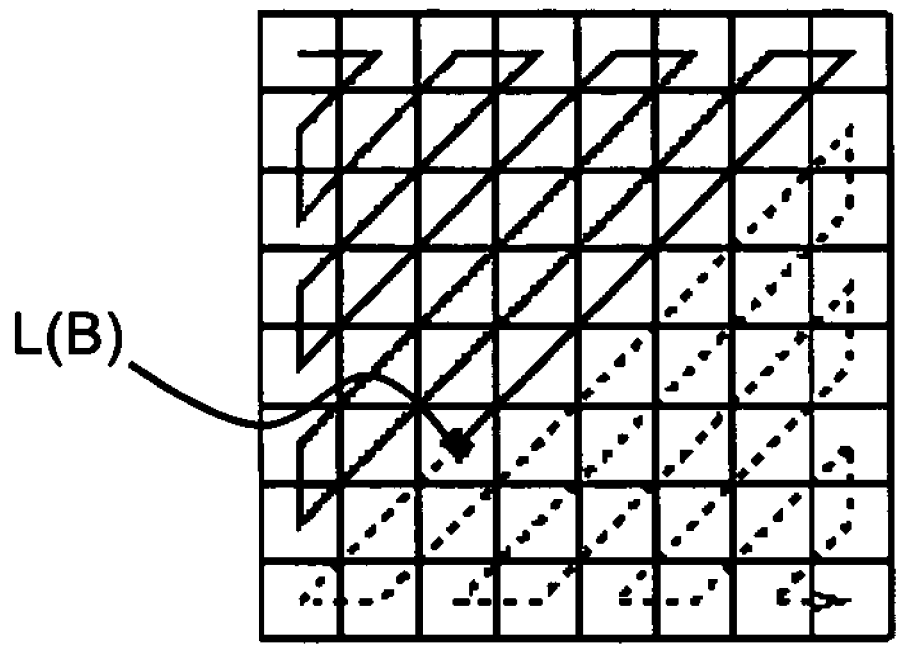
FIG. 11 is a simplified flowchart illustration of a method for scanning of the DCT coefficients of image sub-areas according to their significance, operative in accordance with a preferred embodiment of the present invention.

Reference is now made to FIG. 11, which is a simplified pictorial illustration of a method for scanning the DCT coefficients of image sub-areas in JPEG/MPEG image/video compression according to their significance, operative in accordance with a preferred embodiment of the present invention. In FIG. 11, for predefined image sub-areas B, such as 8×8 pixel blocks, in an image processed using region merging as described hereinabove, the scanning of the DCT coefficients may be stopped when L(B) elements have been processed, where $$L(B) = \begin{cases} 64 & \text{if } C(B) \geq T \\ k \times C(B) & \text{otherwise.} \end{cases}$$

where T is a significance threshold and k is a scaling factor, both of which are image-dependent parameters that may be set by the user or using any conventional technique. This reduces the high frequency DCT data for the blocks having a low C(B) value, and thus provides relative enhancement for the blocks with high significance.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for determining image block significance based on region contrast, the method comprising:
   a) partitioning an image frame into multiple pixel regions of at least one pixel each;
   b) pairing any of said regions with an unpaired, adjoining region;
   c) calculating a similarity value between each region in any of said region pairs;
   d) merging paired regions of any of said pairs into a single region, where said region pair to be merged has a predefined similarity value, thereby creating a new partition of said image frame into multiple pixel regions;
   e) performing steps a)-d) a plurality of times, thereby obtaining a sequence of image partitions;
   f) selecting within said image frame an image sub-area of a predefined size and shape;

g) identifying a partition in said sequence of partitions in which said image sub-area is covered by any of said regions to the extent of a predefined coverage measure; and h) calculating a region contrast significance value C(B) of said image sub-area as a value which is proportional to the position of said identified partition in said sequence of partitions.

2. A method according to claim 1 wherein said calculating step c) comprises calculating the contrast between any of said pairs.

3. A method according to claim 1 wherein said calculating step c) comprises:
calculating the average luminescence of the pixels in one region in any of said pairs; and
subtracting said average luminescence from the average luminescence of the pixels in the other region in said pair.

4. A method according to claim 1 wherein said merging step d) comprises merging where said region pair to be merged has a predefined similarity value representing the least absolute contrast of any of said pairs.

5. A method according to claim 1 wherein said performing step e) comprises performing until a predefined number of regions is achieved.

6. A method according to claim 1 wherein said performing step e) comprises performing until said similarity value reaches a predefined threshold value.

7. A method according to claim 1 wherein said performing step e) comprises performing until a predefined stop condition is met.

8. A method according to claim 1 wherein said selecting step f) comprises selecting an 8×8 pixel block.

9. A method according to claim 1 wherein said identifying step g) comprises identifying the first partition in said sequence of partitions in which said image sub-area is covered by any of said regions to the extent of said predefined coverage measure.

10. A method according to claim 1 wherein said identifying step g) comprises identifying said partition in said sequence of partitions in which said image sub-area is completely covered by any of said regions.

11. A method according to claim 1 wherein said identifying step g) comprises identifying the first partition in said sequence of partitions in which said image sub-area is completely covered by any of said regions.

12. A method according to claim 1 where any of said steps are performed on either of a JPEG image and an MPEG video frame.

13. A method for encoding image sub-areas, the method comprising:
a) partitioning an image frame into multiple pixel regions of at least one pixel each;
b) pairing any of said regions with an unpaired, adjoining region;
c) calculating a similarity value between each region in any of said region pairs;
d) merging paired regions of any of said pairs into a single region, where said region pair to be merged has a predefined similarity value, thereby creating a new partition of said image frame into multiple pixel regions;
e) performing steps a)-d) a plurality of times, thereby obtaining a sequence of image partitions;
f) selecting within said image frame an image sub-area of a predefined size and shape;

g) identifying a partition in said sequence of partitions in which said image sub-area is covered by any of said regions to the extent of a predefined coverage measure;

h) calculating a region contrast significance value of said image sub-area as a value which is proportional to the position of said identified partition in said sequence of partitions; and i) designating said image sub-area for enhanced encoding by a video encoder where said significance value meets a predefined criterion.

14. A method according to claim 13 where any of said steps are performed on either of a JPEG image and an MPEG video frame.

15. A method according to claim 13 wherein said designating step comprises designating where said significance value is at or above a predetermined threshold.

16. A method according to claim 13 wherein said designating step comprises quantizing DCT coefficients of said image sub-area using lower quantizer values than for another image sub-area whose significance value is below said predetermined threshold.

17. A method according to claim 13 wherein said designating step comprises:
scanning DCT coefficients of said image sub-area in accordance with a predefined scanning pattern; and
halting said scanning when L(B) of said DCT coefficients have been scanned, where $$L(B) = \begin{cases} 64 & \text{if } C(B) \geq T \\ k \times C(B) & \text{otherwise}. \end{cases}$$

where T is a predefined significance threshold and k is a predefined scaling factor.

18. A method according to claim 13 wherein said designating step comprises:
scanning DCT coefficients of said image sub-area in accordance with a predefined scanning pattern; and
quantizing any of said DCT coefficients located at an i-th position of said scanning pattern using a quantizer value as P(i)*(M−k*C(B)),
where P(i) is a value of a quantization pattern for i-th position of said scanning pattern, where M is a quantization threshold, and where k is a predefined scaling factor.

19. A method according to claim 13 wherein said designating step comprises:
determining that said image sub-area is to be encoded in INTRA encoding mode where said significance value meets said predefined criterion.

20. A method according to claim 13 wherein said designating step comprises:
determining that said image sub-area is to be encoded in INTRA encoding mode if said image sub-area has a significance value at or above a predetermined threshold.

21. A method according to claim 13 wherein said designating step comprises:
determining that said image sub-area is to be encoded as the difference between said sub-area and a sub-area in another frame if said first sub-area has a significance value below said threshold.

22. Apparatus for encoding image sub-areas according to their significance comprising:
a video encoder; and
a computation module operative to:

a) partition an image frame into multiple pixel regions of at least one pixel each;
b) pair any of said regions with an unpaired, adjoining region;
c) calculate a similarity value between each region in any of said region pairs;
d) merge paired regions of any of said pairs into a single region, where said region pair to be merged has a predefined similarity value, thereby creating a new partition of said image frame into multiple pixel regions;
e) perform steps a)-d) a plurality of times, thereby obtaining a sequence of image partitions;
f) select within said image frame an image sub-area of a predefined size and shape;
g) identify a partition in said sequence of partitions in which said image sub-area is covered by any of said regions to the extent of a predefined coverage measure;
h) calculate a region contrast significance value of said image sub-area as a value which is proportional to the position of said identified partition in said sequence of partitions; and
i) designate said image sub-area for enhanced encoding by said video encoder where said significance value meets a predefined criterion.

23. Apparatus according to claim 22 wherein said computation module is operative to process either of a JPEG image and an MPEG video frame.

24. Apparatus according to claim 22 wherein said computation module is operative to designate said image sub-area for enhanced encoding where said significance value is at or above a predetermined threshold.

25. Apparatus according to claim 22 wherein said computation module is operative to quantize DCT coefficients of said image sub-area using lower quantizer values than for another image sub-area whose significance value is below said predetermined threshold.

26. Apparatus according to claim 22 wherein said computation module is operative to:
scan DCT coefficients of said image sub-area in accordance with a predefined scanning pattern; and
halt said scanning when L(B) of said DCT coefficients have been scanned, where $$L(B) = \begin{cases} 64 & \text{if } C(B) \geq T \\ k \times C(B) & \text{otherwise.} \end{cases}$$

where T is a predefined significance threshold and k is a predefined scaling factor.

27. Apparatus according to claim 22 wherein said computation module is operative to:
scan DCT coefficients of said image sub-area in accordance with a predefined scanning pattern; and
quantize any of said DCT coefficients located at an i-th position of said scanning pattern using a quantizer value as $P(i)*(M-k*C(B))$, where P(i) is a value of a quantization pattern for i-th position of said scanning pattern, where M is a quantization threshold, and where k is a predefined scaling factor.

28. Apparatus according to claim 22 wherein said computation module is operative to:
determine that said image sub-area is to be encoded in INTRA encoding mode where said significance value meets said predefined criterion.

29. Apparatus according to claim 22 wherein said computation module is operative to:
determine that said image sub-area is to be encoded in INTRA encoding mode if said image sub-area has a significance value at or above a predetermined threshold.

30. Apparatus according to claim 22 wherein said computation module is operative to:
determine that said image sub-area is to be encoded as the difference between said sub-area and a sub-area in another frame if said first sub-area has a significance value below said threshold.

31. A computer program embodied on a computer-readable medium, the computer program comprising:
a first code segment operative to partition an image frame into multiple pixel regions of at least one pixel each;
a second code segment operative to pair any of said regions with an unpaired, adjoining region;
a third code segment operative to calculate a similarity value between each region in any of said region pairs;
a fourth code segment operative to merge paired regions of any of said pairs into a single region, where said region pair to be merged has a predefined similarity value, thereby creating a new partition of said image frame into multiple pixel regions;
a fifth code segment operative to perform steps a)-d) a plurality of times, thereby obtaining a sequence of image partitions;
a sixth code segment operative to select within said image frame an image sub-area of a predefined size and shape;
a seventh code segment operative to identify a partition in said sequence of partitions in which said image sub-area is covered by any of said regions to the extent of a predefined coverage measure; and
a eighth code segment operative to calculate a region contrast significance value of said image sub-area as a value which is proportional to the position of said identified partition in said sequence of partitions.

32. A computer program according to claim 31 and further comprising:
a ninth code segment operative to designate said image sub-area for enhanced encoding by said video encoder where said significance value meets a predefined criterion.

* * * * *